Sept. 4, 1934.                P. M. HALL                1,972,297
               METHOD OF PRODUCING ANTISKID CHAIN
                   Filed Aug. 26, 1932    2 Sheets-Sheet 1

INVENTOR.
PRESTON M. HALL
BY
ATTORNEY.

Sept. 4, 1934.   P. M. HALL   1,972,297
METHOD OF PRODUCING ANTISKID CHAIN
Filed Aug. 26, 1932   2 Sheets-Sheet 2
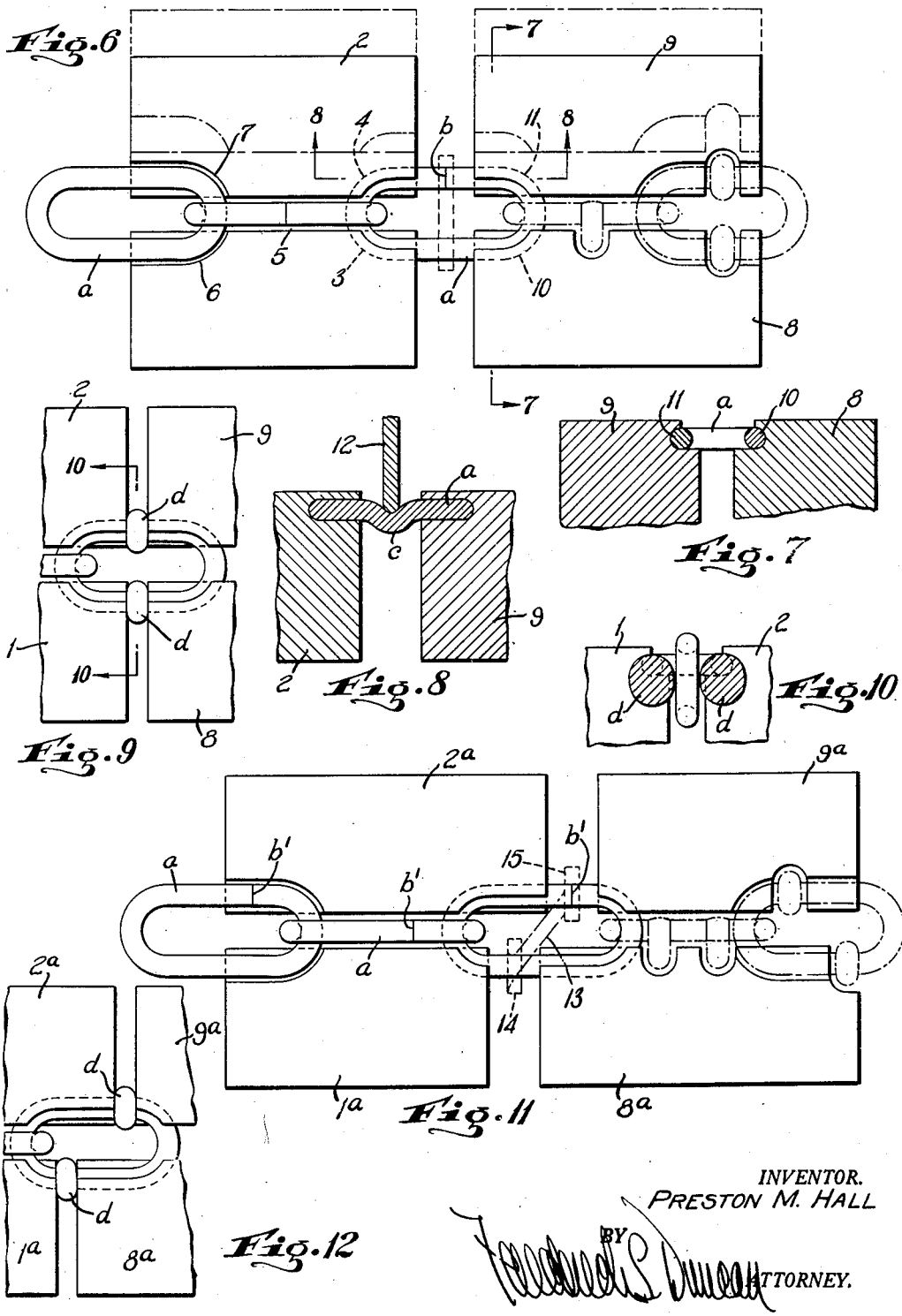
INVENTOR.
PRESTON M. HALL
BY
ATTORNEY.

Patented Sept. 4, 1934

1,972,297

UNITED STATES PATENT OFFICE 1,972,297

METHOD OF PRODUCING ANTISKID CHAIN

Preston M. Hall, Worcester, Mass., assignor to American Chain Company, Inc., New York, N. Y., a corporation of New York Application August 26, 1932, Serial No. 630,529

2 Claims. (Cl. 59—35)

This invention relates to chains for use on the wheels of automobile vehicles to secure improved traction and minimize skidding on slippery ground; and it is particularly applicable to the cross chains of those tire chain fabrics which comprise two longitudinal side chains and numerous transverse chains at short intervals, although not necessarily limited to use with that class of fabric. Its object is primarily to equip chains of the type indicated with projections so disposed as to exert strong resistance to skidding sidewise, as well as lengthwise of the vehicle, and to lengthen the time before the chain wears out.

A very important object relating to the foregoing is to provide such anti-skid and wear-resisting appurtenances on chains otherwise of the character and form heretofore generally used (but not excluding chains of other forms) without substantially increasing the cost of manufacture.

The invention comprises the new features and means by which the primary object is accomplished, chains and links thereof equipped with such means, and also the method and apparatus for making chains and providing anti-skid means on the links thereof, as hereinafter explained. Illustrative forms of the invention and of means for carrying the method phase thereof into effect are shown in the drawings and described in the following specification for the assistance of such explanation, but without intent or effect of limiting the scope in which I claim protection.

Fig. 6 is a plan view of a pair of welding dies or clamps used in carrying out the invention, and shows their association with the links of a chain prior to welding;

Fig. 7 is a sectional view through one of the dies and a chain link associated therewith taken on line 7—7 of Fig. 6;

Fig. 8 is a sectional view taken on line 8—8 of Fig. 6 showing one of the steps in the manufacturing process;

Fig. 9 is a partial view of the welding dies and a chain link at the end of the welding operation;

Fig. 10 is a cross section on line 10—10 of Fig. 9;

Fig. 11 is a view similar to Fig. 7 showing modified forms of dies adapted to weld the link shown in Fig. 3;

Fig. 12 is a view similar to Fig. 8 showing the dies at the end of the welding operation.

Like reference characters designate the same parts wherever they occur in all the figures.

Figure 4:
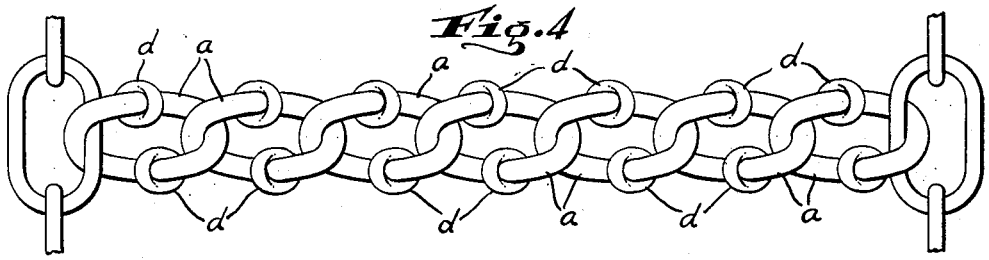
Fig. 4 is a plan view of a completed chain containing the new features of the invention and being otherwise like the cross chains of the standard tire chain fabrics.
Figure 5:
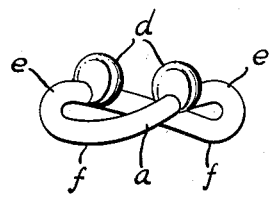
Fig. 5 is a perspective view of one of the links shown in Fig. 3 after twisting into final finished form.

I will explain the invention by describing the procedure followed in producing the specific chain shown in Fig. 4 and the specific link shown in Fig. 5; afterwards indicating the scope in which the same principles may be extended to other forms of chain and variations in procedure.

Flat links $a$, $a$, interlaced with one another as shown, are first made by cutting the proper lengths of wire and bending them so that the two ends of each piece abut at the location $b$, which is preferably midway between the ends of the link. This step is the same as now commonly practised in making standard tire chains, and may be performed by known automatic machines. The links may be made from wire of any desired gauge, within wide limits, and of any length and width provided the links are made long enough for upsetting and welding as later described. The only change from standard practice required at this stage by my invention is to provide a greater length of wire in each link than heretofore used to produce a finished link of given length.

The links are then welded and upset, and for this purpose dies forming part of an electric welding apparatus are used. A suitable set of such dies is shown in Fig. 6. One of the dies consists of a body 1 and a complemental clamp 2 movable away from and toward the body for reception and gripping of one end of a link $a$. The die body 1 has a recess 3 and the clamp 2 has a recess 4, these recesses complementally fitting the curvature of one end of the link at opposite sides of its longitudinal middle; the recesses being otherwise formed to support the link and partly overlap its upper side. A space at 5 is left between the clamps to accommodate the next link of the chain, and recesses at 6 and 7 are provided for the second link.

The other die comprises a body 8 and a clamp 9 provided with recesses 10 and 11 like the recesses 3 and 4 respectively, and otherwise spaced and recessed to accommodate the links and spurs thereon formed by previous welding steps. These dies are made of bronze or other material which is at the same time a good conductor of electricity and sufficiently hard to serve the purpose. They may be connected in any desired way with a source of low voltage electric welding current, suitably in a chain welding machine of well known character. Means of the type heretofore used in chain welding and other electric butt welding machines are provided for moving the clamp members of the die toward and away from the body members, for turning on and interrupting the flow of current, and for moving one of the dies toward the other when the intermediate part of the link has been heated to softness by the flowing current. It is hardly necessary to say that the chain links must be made of a metal which can be thus welded, and that they are preferably made of the same quality of steel heretofore generally used in making tire chains.

When the link thus placed has become soft enough, it is offset to one side of its plane at some point between the dies, preferably about midway between them, as indicated at c in Fig. 8.

Such set is given by a tool 12 which is pressed against both limbs of the link, preferably with a sudden blow, and immediately withdrawn. The limb of the link which contains the abutting ends of the wire, and the opposite limb of continuous wire are both offset in this manner.

The dies are then moved, one toward the other, while the link material is at a welding heat. In so moving they make the weld between the abutting ends of the wire, deepen the bend of the offset, weld together the adjacent sides of the bend, and more or less flatten and spread the soft metal between them. The metal thus extruded forms disk like fins or flanges, each of which is eccentric to the wire from which it projects and is almost wholly at one side of the plane of the link. The thickness of these flanges is determined by the closeness of approach of the dies one to the other, and their lateral dimensions are dependent on this factor and also on the length of link wire originally exposed between the adjacent ends of the dies.

The disk-like fins thus pressed out perform a function on an icy or slippery ground surface analogous to that of the calks of a horse shoe, and therefore will be called calks generally in the following description. While, as previously indicated, the lateral dimensions and thickness of these calks may vary considerably, it is preferred to adopt a ratio substantially as shown in these drawings. Calks of these proportions are thick enough to have great strength and resistance to wear, while at the same time they are thin enough to cut into hard ice and strongly resist slipping of icy ground.

It is to be noted that owing to the difference in resistance of the side strand embodying a joint to be welded, which will heat up more quickly than the opposite continuous strand, it is desirable to bring about a condition in which the effect of the working current will be substantially equal upon both strands, as otherwise the strand with the joint will be subjected to a destructive excess of heat.

An important object of the invention is to provide for bringing about the above condition, and this may be effected in any suitable manner, preferably by interrupting the current one or more times in the process of welding and upsetting. The current is first caused to pass only to an extent sufficient to effect a preliminary weld of the joint, and then the current is interrupted one or more times, giving the heat an opportunity to spread back from the center on each strand, and also giving the joint an opportunity to cool off to approximately the temperature of the other strand, so that the working current will then exert practically the same heating effect upon both strands and the latter will have their heat properly distributed for the upsetting operation. The heating is then continued until the operation is completed.

Another method of heating equally and properly the front and back strands is to use two separate transformer circuits, one for each strand, the voltage for the strand with the joint being lower than that for the back strand, and with this arrangement also it is preferred to apply the current intermittently in order to permit proper distribution of the heat as above described.

It may also be possible to make the resistances of the strands sufficiently equal initially for practical purposes by exerting a very heavy pressure to bring the ends of the strand together at the joint.

In carrying the upsetting operation into effect, the electrodes are preferably made of suitable contour and arranged in proper relation to each other to act as forming dies, being brought sufficiently close together not only to upset the material to form protuberances of substantial dimensions, but also to squeeze the protuberance into the desired shape.

It is to be noted that the bulges or protuberances may be of any suitable shape, those shown being illustrative as a now-preferred form.

The protuberances may be formed so as to project in any radial direction and at any desired angle relatively to the strand.

After the links have been welded and provided with calks, as described, they are twisted to form a chain of the so-called curb chain type, this being the type ordinarily provided for tire chains. Fig. 4 is a plan view of a completed chain placed with the side uppermost which comes next to the tire when in use. The calks d are located midway of the ends of the link. By reason of the twisted formation given to the link, the calks on the different side members of the same link are inclined oppositely to one another. They project outwardly beyond the protuberant ends, which in the ordinary chain are the only parts of the links which bear on the ground, and are therefore in position to dig into the ground surface and also to protect the outer bends of the link from taking all the wear. As their width dimension is lengthwise of the automobile, when the chain is placed in a normal manner on the wheel, they are well adapted to oppose side skidding.

All the effects of the calk are intensified in proportion as they are nearer the high bends of the link. By reference to Fig. 5, which shows the twisted link of an ordinary curb type chain, it has two bends e, e, which protrude toward the road when in place on a tire, and two other bends f, f, which are adapted to bear on the surface of the tire. The bends e, e, are the parts which I have referred to by the term "high bends". If the calks are placed at or near these high bends, they are the only parts of the chain which bear on the road and have a greater effective length than when placed at the middle of the link. They are able to cut more deeply into the road surface and protect the body of the link entirely from wear until themselves are almost entirely worn away.

Figure 1:
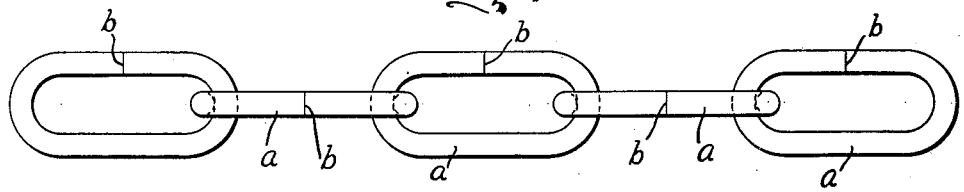
Fig. 1 is a view of part of an uncompleted chain in process of manufacture according to this invention.
Figure 2:
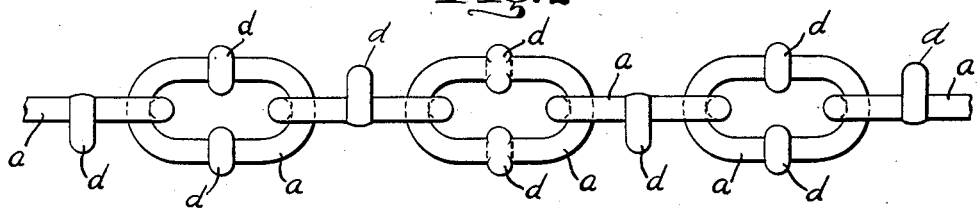
Fig. 2 is a similar view of the same chain in a further stage of manufacture.
Figure 3:
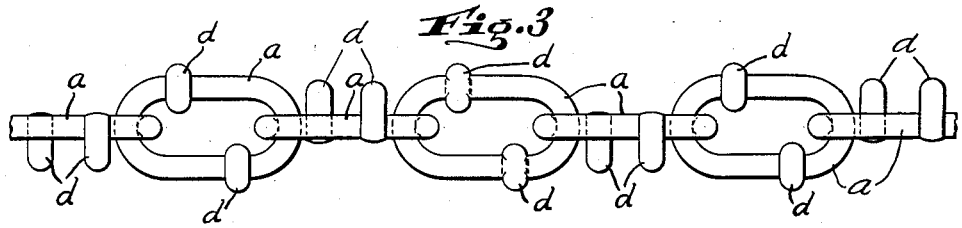
Fig. 3 is a view similar to Fig. 2 of a form of chain differing specifically from the preceding one but containing the same principles.

Location of the calks near the high bends may be effected by a variation in the form of the dies like that shown in Figs. 11 and 12. In this modified form the clamp member 2a of die 1a extends beyond the face of the die body and may overlap more or less the adjacent end of the die body 8a, the clamp member 9a of which is correspondingly set back. Otherwise the dies are substantially like those previously described and have socket recesses for receiving and gripping the links to be treated. The exposed parts of the opposite side limbs of the link are then displaced longitudinally from one another, as clearly appears in the drawings. The butt joint b' between the ends of the wire which forms the link is located in one of these exposed portions. When the link is heated and offset or indented in substantially the same manner as above described, and the dies are moved one toward the other, the resultant calks are formed in longitudinally displaced relationship, that on one limb being near one end of the link and that on the other limb being near the opposite end, as appears plainly in Figs. 12 and 3. In afterwards twisting the link, the twist is given in a direction which throws outward those parts of the link where the calks are located.

It may be noted that in offsetting or indenting the link between the dies 1a and 8a, the two limbs may be separately struck or pressed upon by successive actions of a bar or hammer, or simultaneously by forked tool 13 having a single shank and two peens 14 and 15 spaced apart appropriately to the openings between the parts of the respective dies.

The illustrations herein described are not the only forms in which the invention may be embodied. Calks of the character described may be applied to links which are not twisted but are connected to one another by either straight or twisted links. And the dies by which the links are held and upset, and through which current is passed for welding may be variously formed, constructed and operated. So far as the dies are concerned, it is essential only that they be capable of securely holding the link, of conducting electric welding current to the link material, and of being relatively moved so as to upset the link and form its calks.

As compared with the present practice of making standard tire chains, my new method does not involve any additional processes or steps, but only changes the welding step and the dies used in performing the step so as to form the calks in both limbs of the link at the same time that welding occurs. The new and useful calks of this invention are provided without any additional expense except the inconsiderable item of a greater length of wire to make a link of given length with calks.

What I claim and desire to secure by Letters Patent is:

1. The method of forming integral calks on an anti-skid link which consists in heating the intermediate limbs of such links to welding heat, offsetting the heated parts of these limbs to one side and approaching one of the ends of the link toward the other so that the offsets are deepened and folded, and the sides thereof welded together.

2. The method of butt welding a wire chain link and simultaneously forming calks on the limbs thereof which consists in engaging the end portions of the link with dies of low resistance electrically conductive metal with the junction between abutting ends of the link wire located between said dies, passing a welding electric current through the circuit including the dies and link, giving an initial offset toward one side to the limbs of the link between the dies, and moving one of the dies toward the other when the link material is at welding heat, so that the initial offsets are deepened and narrowed, the sides thereof brought together and welded, and the offsets are equalized between the dies and formed into calks.

PRESTON M. HALL.